US012759209B2

(12) United States Patent
Fukuzawa et al.

(10) Patent No.: US 12,759,209 B2
(45) Date of Patent: Oct. 13, 2026

(54) EXTRUSION DEVICE AND EXTRUSION MOLDING DIE USED BY SAME, MONITORING DEVICE AND PROGRAM, STRAND MANUFACTURING METHOD, AND STRAND DIAMETER ADJUSTMENT METHOD

(71) Applicant: THE JAPAN STEEL WORKS, LTD., Tokyo (JP)

(72) Inventors: Yohei Fukuzawa, Tokyo (JP); Yusuke Fukushi, Tokyo (JP); Tomoya Oda, Tokyo (JP); Hideki Tomiyama, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 293 days.

(21) Appl. No.: 18/272,580

(22) PCT Filed: Nov. 15, 2021

(86) PCT No.: PCT/JP2021/041870
§ 371 (c)(1),
(2) Date: Jul. 16, 2023

(87) PCT Pub. No.: WO2022/185623
PCT Pub. Date: Sep. 9, 2022

(65) Prior Publication Data

US 2024/0075671 A1 Mar. 7, 2024

(30) Foreign Application Priority Data

Mar. 3, 2021 (JP) ................................ 2021-033644

(51) Int. Cl.
*B29C 48/92* (2019.01)
*B29C 48/30* (2019.01)
*B29C 48/345* (2019.01)

(52) U.S. Cl.
CPC ........... *B29C 48/92* (2019.02); *B29C 48/302* (2019.02); *B29C 48/345* (2019.02);
(Continued)

(58) Field of Classification Search
CPC ..... B29C 48/92; B29C 48/302; B29C 48/345; B29C 2948/92523; B29C 2948/92704;
(Continued)

(56) References Cited

U.S. PATENT DOCUMENTS 3,993,721 A * 11/1976 Soda .................... B29C 44/468 264/45.9
4,472,129 A 9/1984 Siard
(Continued)

FOREIGN PATENT DOCUMENTS

CN 101679547 A 3/2010
DE 202006018456 U1 * 3/2007 ............... B01J 2/20
(Continued)

OTHER PUBLICATIONS

Partial Supplementary European Search Report issued Feb. 18, 2025, for European Patent Application No. 21929182.0.
(Continued)

*Primary Examiner* — Nahida Sultana
(74) *Attorney, Agent, or Firm* — Potomac Law Group, PLLC

(57) ABSTRACT

An extrusion device includes a cylinder, a raw material feed port, a screw incorporated in cylinder, a die disposed at one end of the cylinder, and adjustment mechanisms. Raw material feed port supplies raw materials including resin into cylinder. Screw is able to melt the raw materials through kneading. Die includes a plurality of through-holes for ejecting strands made of molten resin supplied from cylin-
(Continued)

der. Adjustment mechanisms individually adjust ejection amounts of the strands ejected from the plurality of through-holes.

13 Claims, 9 Drawing Sheets

(52) U.S. Cl.
CPC ............... *B29C 2948/92123* (2019.02); *B29C 2948/92523* (2019.02); *B29C 2948/92619* (2019.02); *B29C 2948/92704* (2019.02); *B29C 2948/92904* (2019.02)

(58) Field of Classification Search
CPC ........... B29C 2948/92619; B29C 2948/92904; B29C 2948/92123
See application file for complete search history.

(56) References Cited

U.S. PATENT DOCUMENTS

| | | | | |
|---|---|---|---|---|
| 10,500,792 | B2 * | 12/2019 | Mantell | B29C 48/02 |
| 2003/0008032 | A1 * | 1/2003 | Walker | B29C 48/345 425/464 |
| 2008/0197519 | A1 | 8/2008 | Bacher et al. | |
| 2010/0063214 | A1 | 3/2010 | Kasahara et al. | |
| 2010/0123262 | A1 * | 5/2010 | Keller | B29C 48/405 425/114 |
| 2012/0126466 | A1 | 5/2012 | Tajiri | |
| 2018/0354182 | A1 | 12/2018 | Miyake | |
| 2019/0030819 | A1 * | 1/2019 | Mantell | B29C 48/345 |
| 2020/0298450 | A1 * | 9/2020 | Schnellbach | B29B 9/065 |

FOREIGN PATENT DOCUMENTS

| | | | | |
|---|---|---|---|---|
| JP | S57-159415 | U | 10/1982 | |
| JP | S57178727 | A | 11/1982 | |
| JP | 06-234149 | * | 8/1994 | B29C 47/92 |
| JP | H06-234149 | A | 8/1994 | |
| JP | 2000-318019 | * | 11/2000 | B29C 47/88 |
| JP | 2000-318019 | A | 11/2000 | |
| JP | 2009-292015 | A | 12/2009 | |
| JP | 2018001649 | A | 1/2018 | |
| WO | 2010140310 | A1 | 12/2010 | |

OTHER PUBLICATIONS

Extended European Search Report issued May 13, 2025, in European Patent Application No. 21929182.0.
International Search Report for International Patent Application No. PCT/JP2021/041870, Jan. 18, 2022.
Office Action issued Jul. 24, 2025, in Chinese Patent Application No. 202180094932.5.

* cited by examiner

EXTRUSION DEVICE AND EXTRUSION MOLDING DIE USED BY SAME, MONITORING DEVICE AND PROGRAM, STRAND MANUFACTURING METHOD, AND STRAND DIAMETER ADJUSTMENT METHOD

TECHNICAL FIELD

The present disclosure relates to an extrusion device, an extrusion molding die, a monitoring device and a monitoring program, a strand manufacturing method, and a strand diameter adjustment method, and more specifically to a technique for uniformizing a diameter of molten resin (strand) ejected from an extrusion device.

BACKGROUND ART

Pellets made of a resin raw material may be used when a thermoplastic resin molded article is manufactured. As one method for molding pellets, a strand cutting method is known. Japanese Patent Laying-Open No. 2018-001649 (PTL 1) discloses a method for reducing variations in strand diameter in the strand cutting method.

Japanese Patent Laying-Open No. 2018-001649 (PTL 1) discloses a configuration of an extruder to uniformize a strand diameter by differentiating, in a flow path width direction, a length of a crown disposed between a die and a die holder in a flow path direction.

CITATION LIST

Patent Literature

PTL 1: Japanese Patent Laying-Open No. 2018-001649

SUMMARY OF INVENTION

Technical Problem

In the configuration disclosed in PTL 1, the strand diameter is uniformized by changing the shape of a flow path member through which the resin raw material passes. On the other hand, there are increasing needs to realize a further uniformized strand diameter by enabling adjustment of the strand diameter even during an operation of the extrusion device.

The present disclosure was made in order to solve such a problem, and an object thereof is to uniformize a strand diameter by enabling adjustment of the strand diameter during an operation of an extrusion device in the extrusion device that is used to manufacture a thermoplastic resin molded article.

Solution to Problem

An extrusion device according to the present disclosure is configured such that ejection amounts of strands ejected from a plurality of through-holes can be individually adjusted by adjustment mechanisms.

Advantageous Effects of Invention

According to the extrusion device of the present disclosure, it is possible to adjust the strand diameters by the adjustment mechanisms even during an operation of the extrusion device and thereby to uniformize the strand diameters.

DESCRIPTION OF EMBODIMENT

Figure 1:
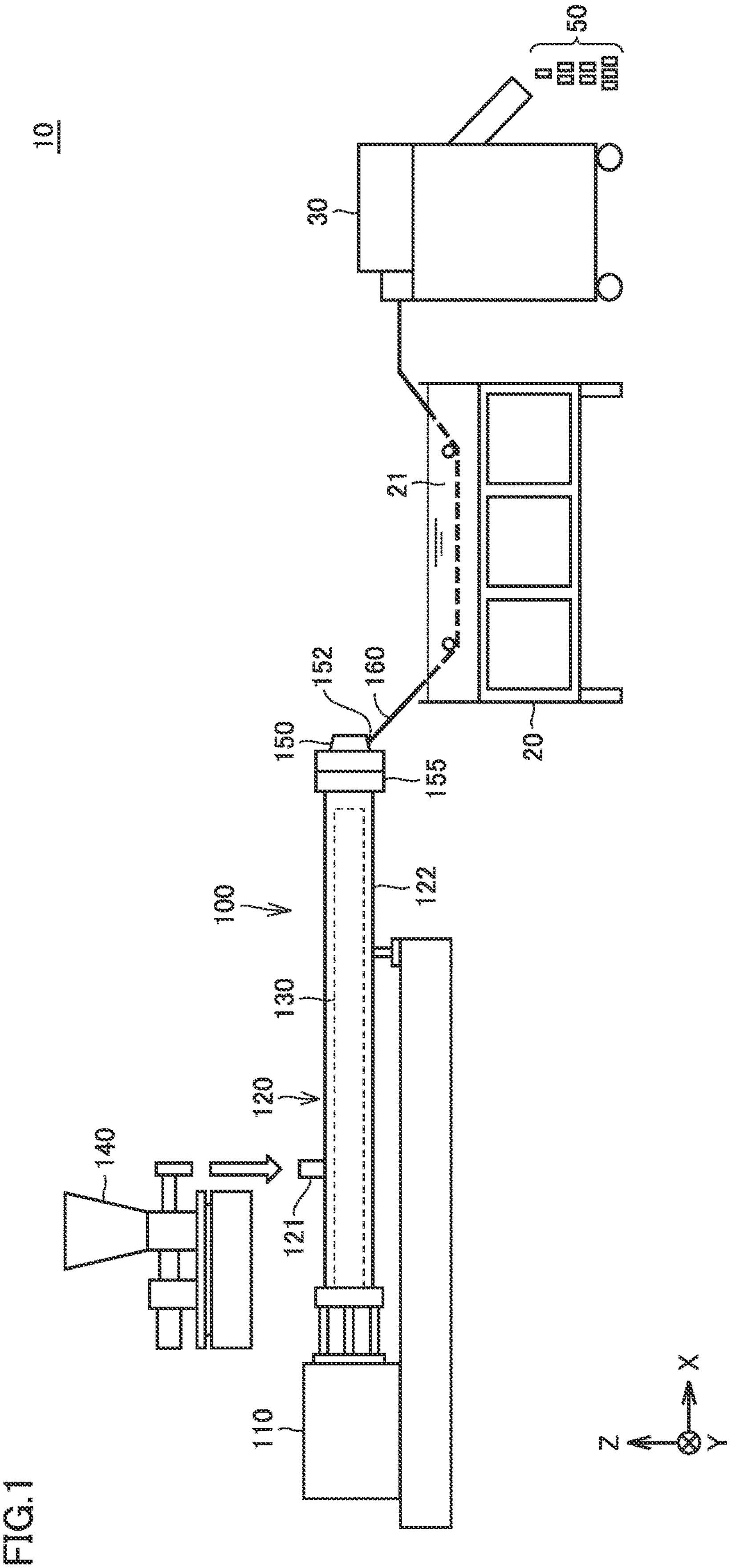
FIG. 1 is an overview configuration diagram of a pellet manufacturing apparatus using an extrusion device according to an embodiment.

Hereinafter, an embodiment of the present disclosure will be described in detail with reference to the drawings. Note that the same reference signs will be applied to the same or corresponding parts in the drawings and the description thereof will not be repeated.

[Configuration of Pellet Manufacturing Apparatus]

FIG. 1 is an overview configuration diagram of a pellet manufacturing apparatus 10 using an extrusion device 100 according to the present embodiment. Referring to FIG. 1, pellet manufacturing apparatus 10 includes a cooling tank 20 and a strand cutter 30 in addition to extrusion device 100. Pellet manufacturing apparatus 10 cools molten resin 160 (hereinafter, also referred to as "strands 160") extruded from extrusion device 100 in cooling tank 20 and cut molten resin 160 into a predetermined length by strand cutter 30. Pellets 50 are thus formed.

Extrusion device 100 is a manufacturing device for strands 160. Extrusion device 100 includes a driving unit 110, a cylinder 120, a feeder 140, and a die 150. Note that in FIG. 1 and the following description will be given on the assumption that a vertical direction is a Z axis, an extending direction of cylinder 120 in a horizontal direction is an X axis, and a direction perpendicularly intersecting the X axis and the Z axis is a Y axis.

Driving unit 110 is configured to include, for example, a motor and a decelerator. Driving unit 110 is disposed at one end of cylinder 120 extending in the X-axis direction in FIG. 1. Driving unit 110 causes a screw 130 disposed inside cylinder 120 to rotate.

Cylinder 120 is a tubular member with a hollow inside and accommodates one or two screws 130 therein. An inlet port 121 (raw material feed port) is formed in cylinder 120 for putting the raw materials as pellets supplied from feeder 140 into the cylinder. Also, a heater 122 for heating the inside of cylinder 120 is disposed on the outer circumference of cylinder 120. The raw materials put into the cylinder 120 are melted through kneading with heat from heater 122 and rotation of screw 130. Then, the molten raw materials are transferred to the other end of cylinder 120 on the side opposite to driving unit 110 through the rotation of screw 130.

Die 150 is connected to the other end of cylinder 120 via a die holder 155. As will be described later in FIG. 2, a plurality of through-holes 152 are formed in a Y-axis direction in die 150. The molten resin transferred by screw 130 is extruded from through-holes 152 and is ejected as string-shaped strands 160. A configuration of die 150 will be described in detail in FIGS. 2 to 4.

Strands 160 ejected from die 150 are guided to cooling tank 20, and cooled and solidified by a coolant 21 stored in cooling tank 20. Cooled strands 160 are fed to strand cutter 30. Strand cutter 30 cuts strands 160 into a predetermined length, and pellets 50 are thereby formed.

[Configuration of Die]

Figure 2:
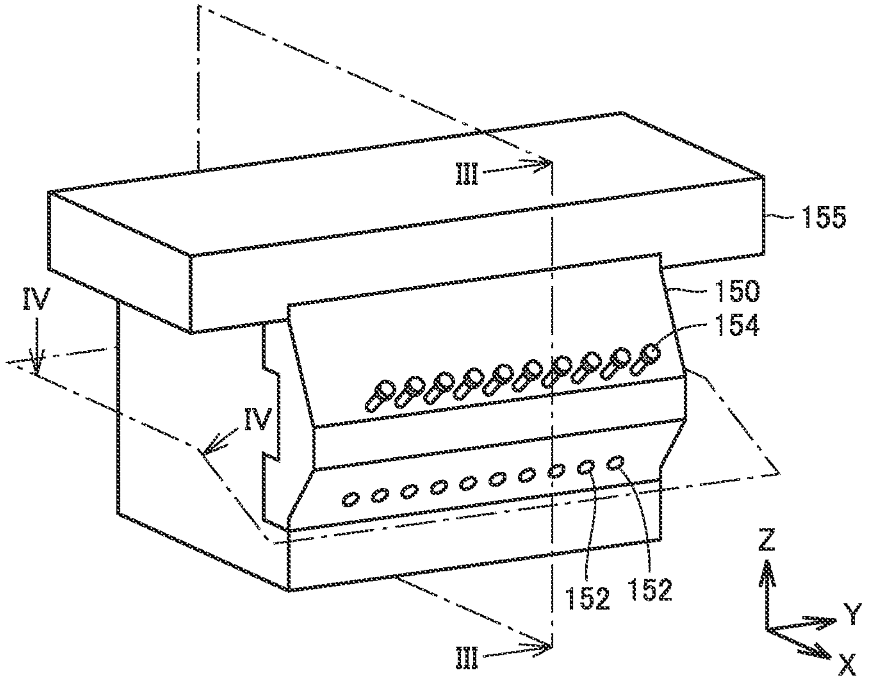
FIG. 2 is a perspective view of a die of the extrusion device in FIG. 1.
Figure 3:
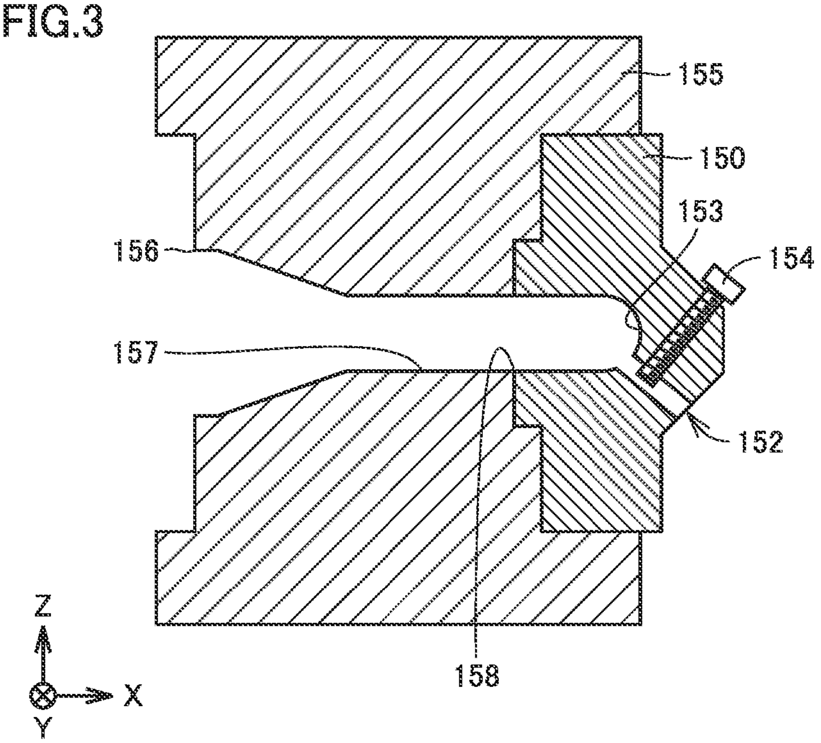
FIG. 3 is a sectional view along the line III-III in FIG. 2.

Next, a detailed configuration of die 150 will be described by using FIGS. 2 to 4. FIG. 2 is a perspective view of a state where die 150 is held by die holder 155 in extrusion device 100. FIG. 3 is a sectional view along a line III-III in FIG. 2. Also, FIG. 4 is a sectional view along a line IV-IV in FIG. 2.

Figure 4:
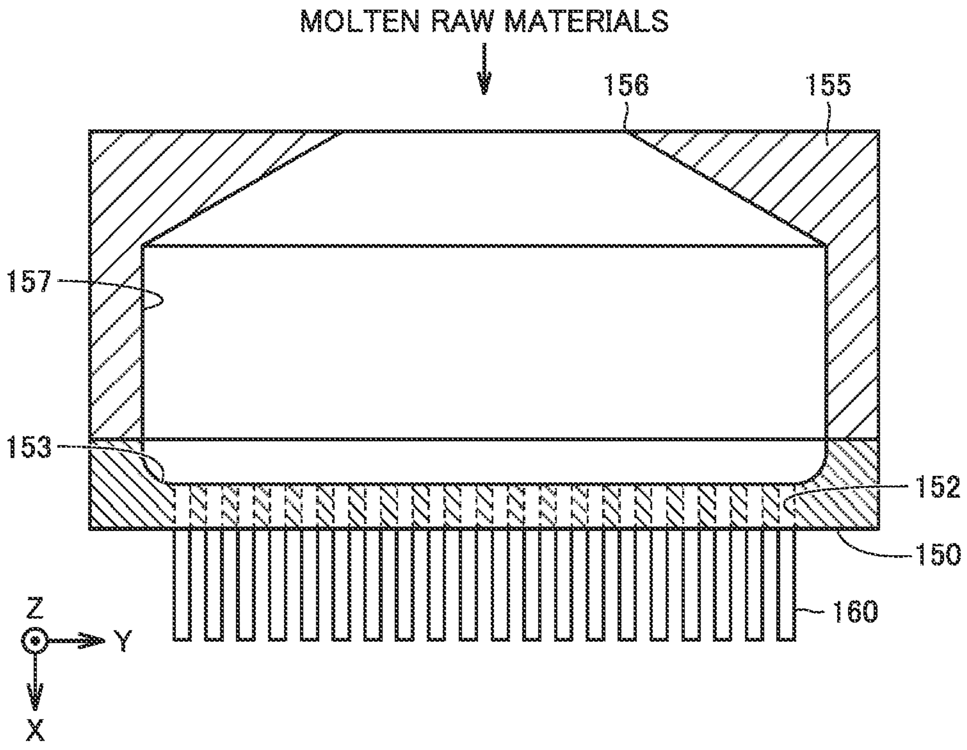
FIG. 4 is a sectional view along the line IV-IV in FIG. 2.

Referring to FIGS. 2 to 4, die holder 155 includes a flow-in portion 156, a flow-out portion 158, and a flow path portion 157 that establishes communication between flow-in portion 156 and flow-out portion 158. Flow-in portion 156 is formed at an end portion of die holder 155 in a negative direction of the X axis. Flow-in portion 156 is connected to an end portion of cylinder 120, and molten resin kneaded and transferred by screw 130 flows into flow-in portion 156.

Flow-out portion 158 is formed at an end portion of die holder 155 in a positive direction of the X axis. Die 150 is connected to flow-out portion 158. The molten resin flowed into flow-in portion 156 passes through flow path portion 157 and is then guided to a recessed portion 153 of die 150.

Plurality of through-holes 152 are formed in the Y-axis direction in die 150, the through-holes 152 establishing communication between recessed portion 153 and the outside. The molten resin passed through die holder 155 and flowed into recessed portion 153 of die 150 is extruded from through-holes 152 and is ejected as string-shaped strands 160.

Also, die 150 according to the present embodiment is provided with adjustment mechanisms 154 for adjusting strand diameters by changing minimum sectional areas of through-holes 152 for each of through-holes 152. In the example in FIGS. 2 and 3, adjustment mechanisms 154 are formed as bolt members having screw mechanisms, and can change amounts of projection of the bolt members into through-holes 152 by a user manually rotating the bolt members. In other words, the minimum sectional areas of through-holes 152 are sectional areas formed by parts of the bolt members projecting into through-holes 152 and the inner surfaces of through-holes 152. In this manner, it is possible to adjust ejection amounts of the molten resin from through-holes 152 per unit time by using adjustment mechanisms 154 and thereby to individually adjust the strand diameters. Note that in the example in FIGS. 2 and 3, shaft parts of the bolt members corresponding to "moving units" in the present disclosure.

Note that adjustment mechanisms 154 are not limited to the bolt members as in the above example as long as they have a configuration including mechanisms to change the amounts of projection into through-holes 152. Other examples of adjustment mechanisms 154 include pins, slide mechanisms, cylinders, and the like. Alternatively, adjustment mechanisms 154 may be flow amount adjustment valves attached to through-holes 152 or mechanisms for changing a flow path resistance such as balloon catheters.

In manufacturing of pellets by using a so-called strand cutting method as described above, variations in strand diameters may cause variations in weight of each completed pellet. If weights of the pellets vary in manufacturing of a thermoplastic resin molded article, there may be a case where scaling accuracy of the resin raw material is degraded and this leads to a problem in operation of an injection molding machine. According to the extrusion device in the present embodiment, it is possible to individually adjust each strand diameter as needed even during an operation of the extrusion device, by the adjustment mechanisms provided in the die. It is thus possible to uniformize the diameters of the strands ejected from the extrusion device.

[Monitoring Device]

Next, a monitoring device that detects strand diameters during an operation of the extrusion device will be described. It is possible to quickly adjust strand diameters in a case where the strand diameters have changed due to a change in manufacturing conditions, for example, by detecting the strand diameters during the operation in real time, which is useful for preventing variations in strand diameters.

First Example: Imaging Camera

Figure 5:
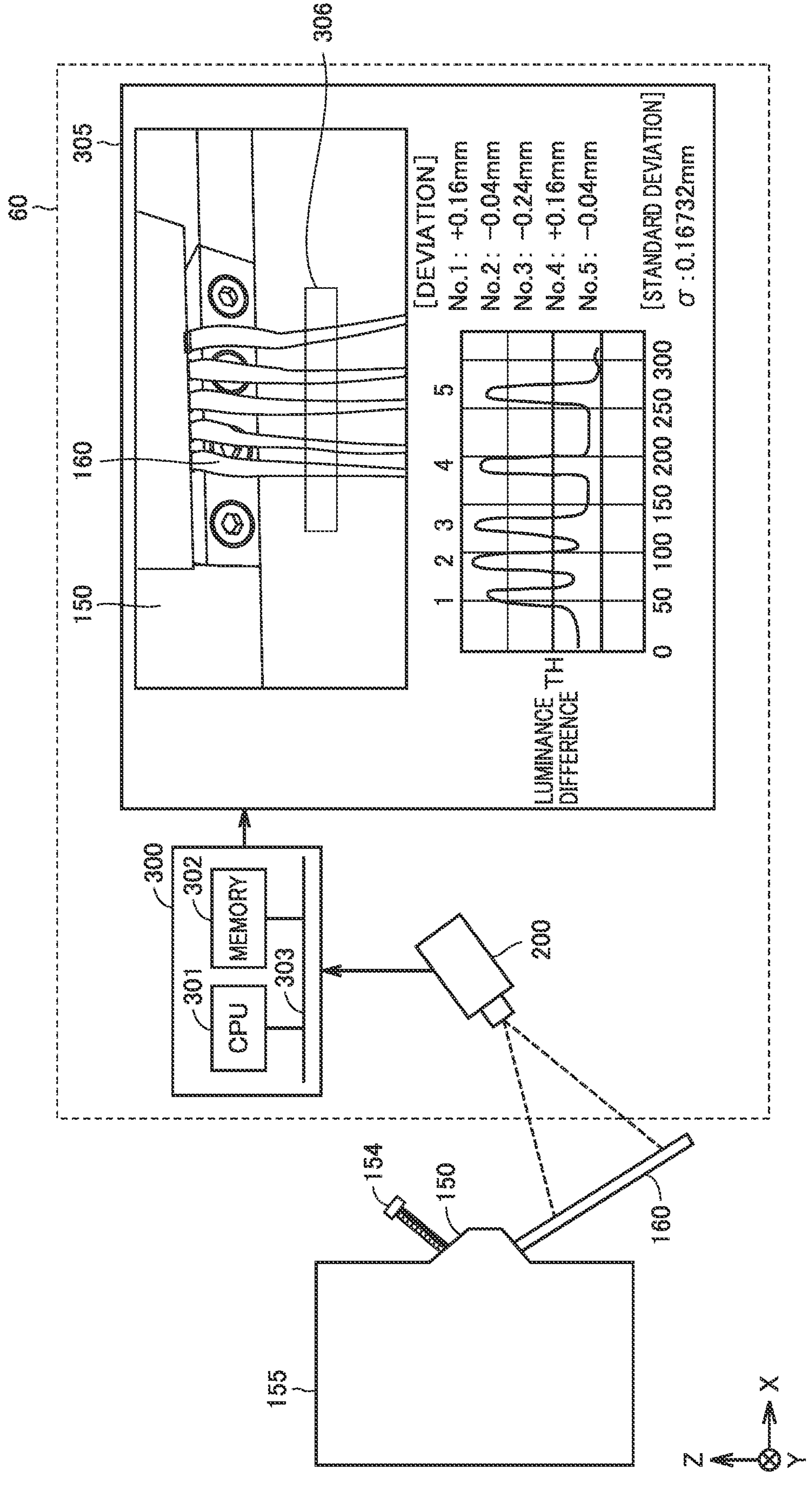
FIG. 5 is a diagram for explaining a first example of a configuration of a monitoring device according to the embodiment.

FIG. 5 is a diagram illustrating a configuration of a first example of the monitoring device that can be applied to extrusion device 100 according to the embodiment. A monitoring device 60 of the first example includes an imaging device 200, a control device 300, and a display device 305. Imaging device 200 is, for example, a stationary CCD camera. Imaging device 200 is installed such that strands 160 ejected from die 150 are within a field of view. An image detected by imaging device 200 is transmitted to control device 300. Note that the image captured by imaging device 200 is not limited to a still image and may be a moving image. Also, imaging device 200 is not limited to a CCD camera as long as the device can acquire an image and may be, for example, an image sensor.

Control device 300 is typically a personal computer and incorporates a central processing unit (CPU) 301 and a memory 302. CPU 301 and memory 302 are connected to a common bus 303, and various kinds of processing is realized by CPU 301 executing a program stored in memory 302. Control device 300 performs binarization processing on the image acquired from imaging device 200 and calculates a strand diameter (strand width) of each strand 160. Note that control device 300 may be a programmable logic controller (PLC), a micro-computer, a micro-computer board, or the like.

Display device 305 is composed of, for example, a liquid crystal diode (LCD) panel or an organic electronic luminescence (EL) panel, and displays the image acquired by imaging device 200 and the strand diameter computed by control device 300. In the example in FIG. 5, an image of five strands 160 is displayed at an upper portion of display device 305. Also, a luminance difference inside a region 306 in the image at the upper portion is displayed in the graph form at a lower portion of display device 305. For example, parts where the detected luminance differences are a threshold value TH or more are detected as the strands, and the widths of strands 160 at threshold value TH are detected as the strand diameters. Moreover, a deviation of each strand 160 from an average value and a standard deviation of the entirety are displayed as numerical values on display device 305. Note that in addition to the deviation from the average value and the standard deviation, an ejection speed of each strand 160, an average value and dispersion of the strand diameters, and a result of determining whether or not the variations fall within a predetermined range may be displayed.

The user determines a degree of variations in strand diameters on the basis of the deviation of the strand diameters from the average value and the standard deviation or dispersion displayed on display device 305. In a case where the variations are large, the user adjusts adjustment mechanisms 154 of die 150 with the strand diameters with large deviations from the average value and performs adjustment such that the variations in strand diameters fall within the predetermined range.

It is possible for the user to easily detect the strand diameters during an operation of the extrusion device by providing such a monitoring device, and thereby to quickly adjust the strand diameters even in a case where variations in strand diameters are large.

Note that in the first example, "imaging device 200", "control device 300", and "display device 305" correspond to an "imaging unit", a "detection unit", and an "output unit" in the present disclosure, respectively.

Second Example: Mobile Terminal

Figure 6:
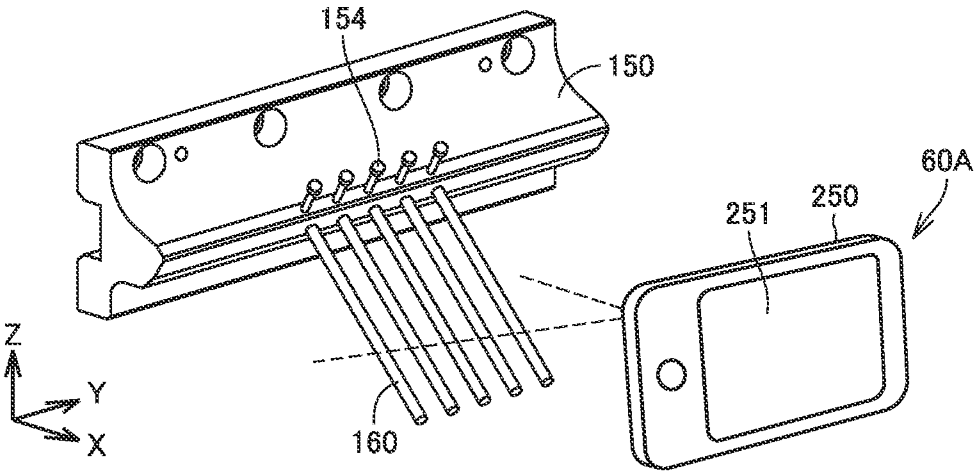
FIG. 6 is a diagram for explaining a second example of the configuration of the monitoring device according to the embodiment.

Next, a configuration of a second example of the monitoring device that can be applied to extrusion device 100 according to the embodiment will be described by using FIGS. 6 and 7. FIG. 6 illustrates a state where strands 160 are being monitored by using a monitoring device 60A in the second example. Also, FIG. 7 is a display example of monitoring device 60A.

Figure 7:
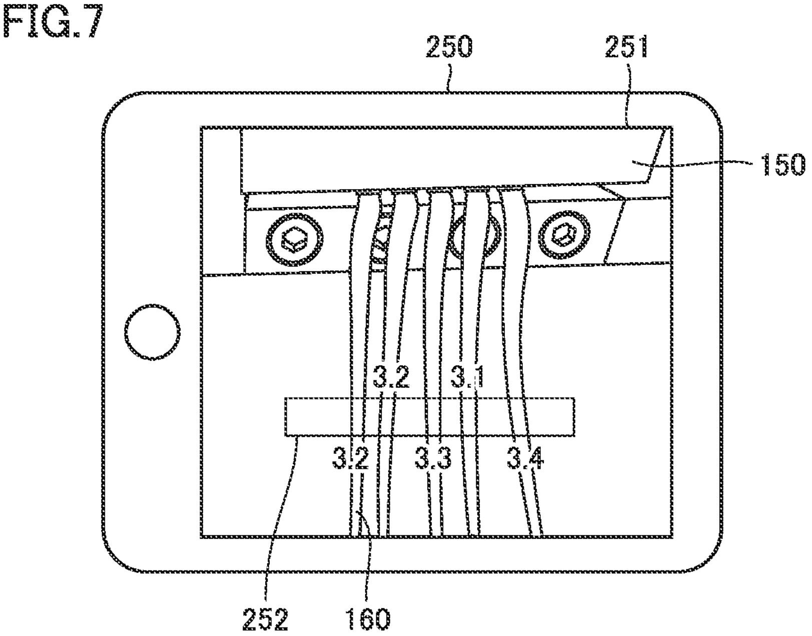
FIG. 7 is a display example of a terminal device used in the monitoring device in FIG. 6.

Referring to FIGS. 6 and 7, monitoring device 60A in the second example is a mobile terminal 250 having an imaging function and a display function. Mobile terminal 250 includes, for example, a tablet, a smartphone, a mobile phone, and a wearable terminal such as a smart watch or smart glasses. An application for monitoring strands has been installed in mobile terminal 250. The monitoring application is executed by a CPU incorporated in mobile terminal 250 or a CPU on a cloud.

Once the user executes the application for monitoring strands on mobile terminal 250, a camera incorporated in mobile terminal 250 is activated. When the user places mobile terminal 250 such that strands 160 are located within the field of view of the camera, strands 160 imaged by the camera are displayed on a display 251 of mobile terminal 250 as illustrated in FIG. 7. When a rectangular region 252 displayed on display 251 is superimposed on the image of strands 160 in that state, the strand diameter of each strand 160 inside region 252 is displayed on display 251. Note that mobile terminal 250 may automatically detect molten resin 160 inside the captured image and measure and display the diameters of detected molten resin 160.

As in the second example, it is possible to detect the strand diameters during an operation without using a dedicated device as in the first example by installing the monitoring application on the user's mobile terminal. Also, it is possible to reduce variations in strand diameters by adjusting the adjustment mechanisms as needed on the basis of the detected strand diameters.

Note that in the second example, the "camera", the "CPU", and "display 251" mounted on mobile terminal 250 correspond to the "imaging unit", the "detection unit", and the "output unit" in the present disclosure, respectively.

Monitoring Program

Figure 8:
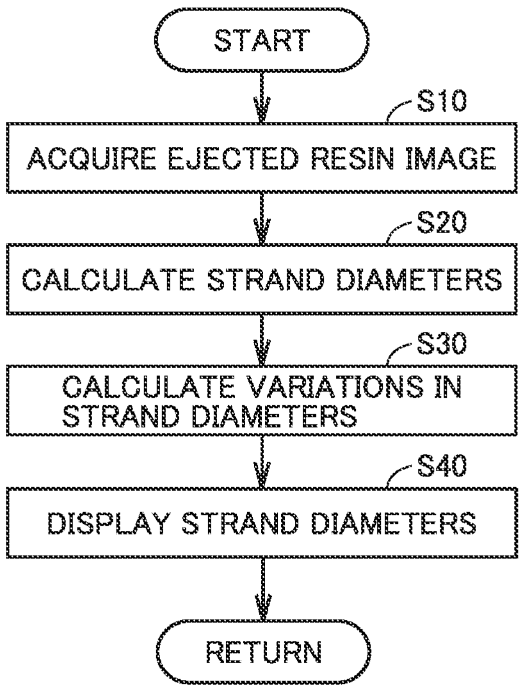
FIG. 8 is a flowchart of a monitoring program used in the monitoring device.

FIG. 8 is a flowchart illustrating processing of a monitoring program (application) executed in above monitoring devices 60 and 60A. The flowchart illustrated in FIG. 8 is executed by CPU 301 in control device 300 in FIG. 5 or a CPU incorporated in mobile terminal 250 in FIG. 6.

Referring to FIG. 8, the CPU acquires an image of ejected resin (strands) ejected from die 150 during an operation of extrusion device 100 that has been captured by the imaging device (camera) in step (hereinafter, step will be abbreviated as S) 10. Next, the CPU calculates, in S20, a strand diameter of each strand 160 by processing the acquired image, and calculates, in S30, a parameter (such as dispersion or a standard deviation) indicating variations in strand diameters or an average value. Then, in S40, the CPU displays, on the display device, at least one of the calculated strand diameter of each strand 160 and the parameter indicating variations.

The user can easily detect the strand diameters and variations in strand diameters during an operation of the extrusion device by executing such processing. It is possible to reduce variations in strand diameters and to uniformize the strand diameters by the user adjusting adjustment mechanisms 154 of die 150 during an operation of the extrusion device in a case where the detected variations in strand diameters are large.

Note that although the example in which the strand diameters are detected by processing the image captured by the imaging device has been described in the above example, the strand diameters may be detected by another method. For example, instead of the imaging device, the strand diameter of each strand may be detected by using a non-contact-type sensor such as a photoelectric sensor, a spectroscopy/optical interference-type thickness gauge, an infrared film thickness gauge, a laser thickness gauge, an ultrasonic film thickness gauge, a fluorescent X-ray film thickness gauge, an eddy current-type film thickness gauge, an electromagnetic-type film thickness gauge, or an electrical resistance-type film thickness gauge.

[Automatic Adjustment System]

In the aforementioned example, a case where the adjustment of the strand diameters is performed by a user's manual operation has been described. However, a configuration in which the adjustment mechanisms are automatically adjusted on the basis of the detected strand diameters by using the monitoring device as illustrated in the first example in FIG. 5 may be adopted.

Figure 9:
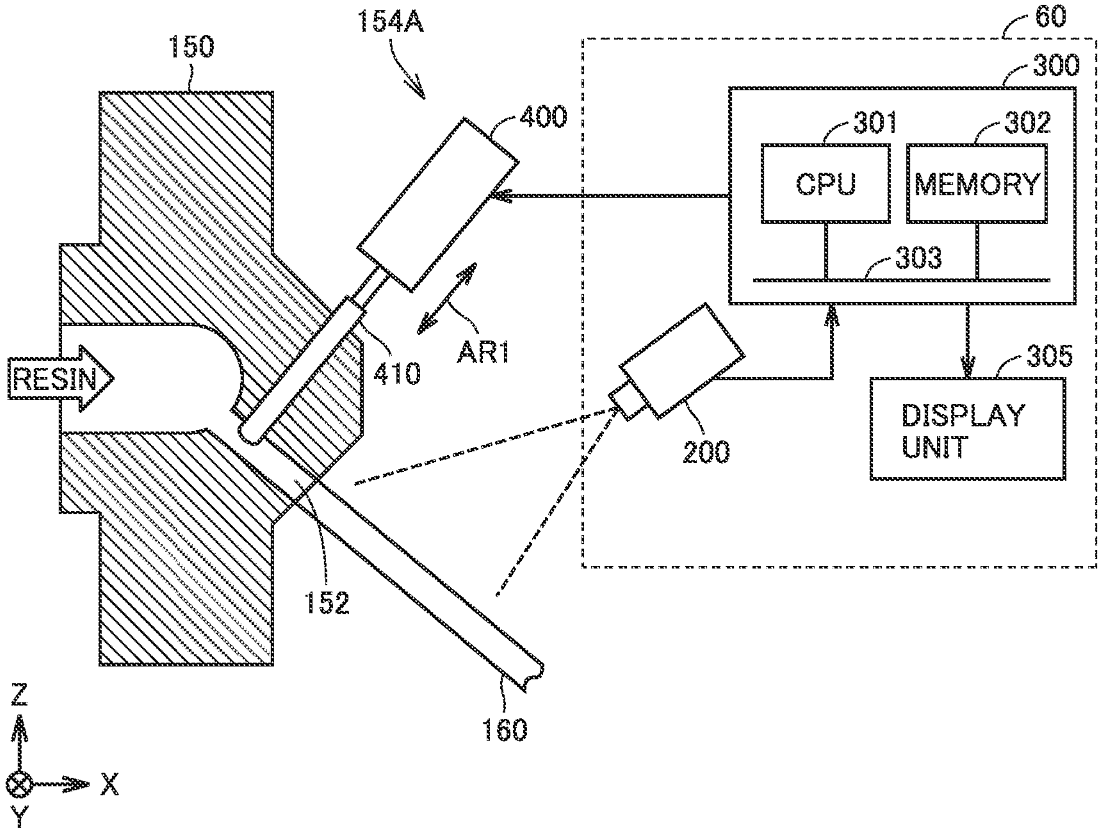
FIG. 9 is a diagram for explaining an overview of an automatic adjustment function of a strand diameter.

FIG. 9 is a diagram for explaining a system having a function of automatically adjusting strand diameters. In the system in FIG. 9, die 150 is provided with adjustment mechanisms 154A in addition to monitoring device 60 illustrated in FIG. 5. Adjustment mechanisms 154A include moving units 410 disposed at parts of bolt members that are adjustment mechanisms 154 described in FIG. 2 and driving units (actuators) 400 for driving moving units 410.

Moving units 410 are allowed to project into through-holes 152 of die 150 similarly to the bolt members in FIG.

2. Moving units 410 may be configured to move in a direction of an arrow AR1 in FIG. 9 by rotating like the bolt members or may be configured to move in the direction of arrow AR1 in a linear moving scheme like a slide mechanism. Alternatively, adjustment mechanisms 154 may be valves that are attached to outlets of through-holes 152 and are able to adjust the ejection amounts of the molten resin by adjusting opening degrees.

Driving units 400 are actuators of a pneumatic type, a hydraulic type, or an electric type and are composed of, for example, cylinders, motors, ball screws, or the like. Driving units 400 drive moving units 410 on the basis of a signal from control device 300.

Figure 10:
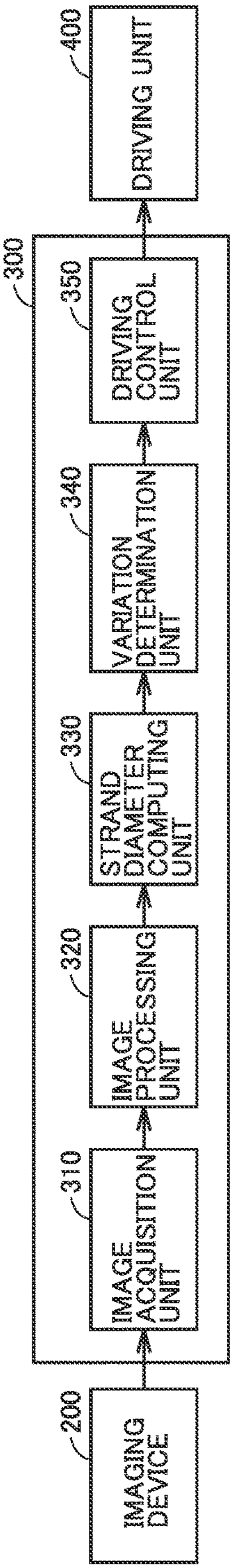
FIG. 10 is a functional block diagram of a strand diameter adjustment function of a control device.

Next, the automatic adjustment function of control device 300 will be described by using FIGS. 10 and 11. FIG. 10 is a functional block diagram of the strand diameter adjustment function of control device 300. Referring to FIG. 10, control device 300 includes an image acquisition unit 310, an image processing unit 320, a strand diameter computing unit 330, a variation determination unit 340, and a driving control unit 350.

Image acquisition unit 310 receives image data captured by imaging device 200. Image processing unit 320 processes the image acquired by image acquisition unit 310 and specifies strands 160 in the image data. Strand diameter computing unit 330 computes the strand diameter of each strand 160 from the image of the specified strands.

Variation determination unit 340 computes an average value of the strand diameters or a parameter (dispersion, a standard deviation, or the like) indicating variations by using the data of the calculated strand diameters, determines whether or not there are variations, and outputs a determination result to driving control unit 350. Driving control unit 350 generates a control signal for driving corresponding to each strand 160 on the basis of the determination result from variation determination unit 340 and controls driving units 400 in accordance with the driving signal.

Figure 11:
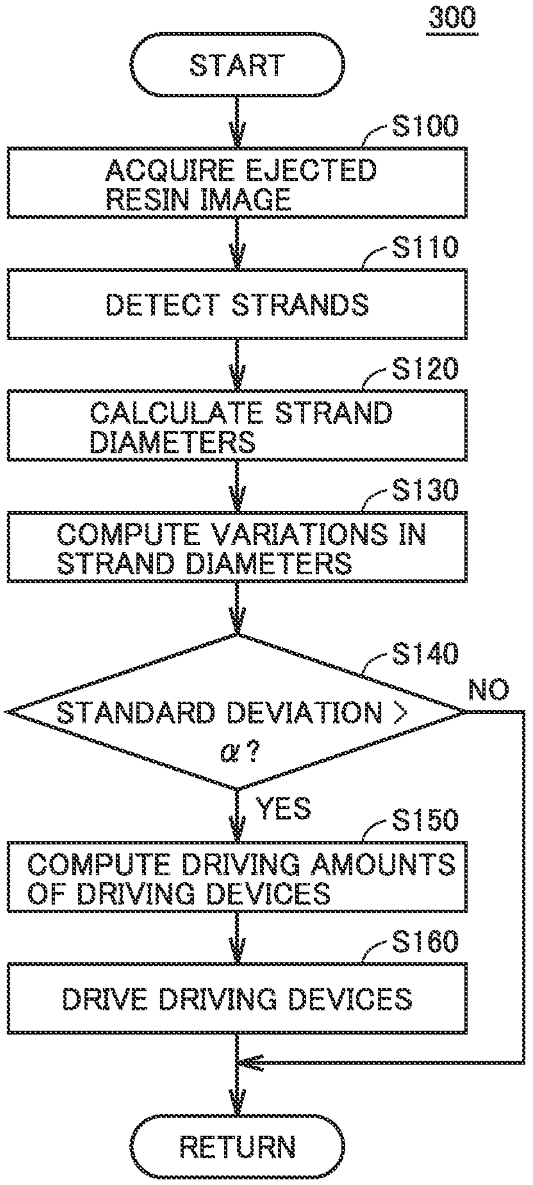
FIG. 11 is a flowchart illustrating processing executed by the control device.

FIG. 11 is a flowchart illustrating processing executed by CPU 301 of control device 300. The flowchart illustrated in FIG. 11 is called from a main routine, which is not illustrated, and is executed in a case where a predetermined condition is satisfied. For example, the processing may be executed at a business start time or may be periodically executed every predetermined time. Alternatively, the processing may be continuously executed during an operation of extrusion device 100 or may be executed in accordance with the user's instruction. Furthermore, the processing may be executed in accordance with a device state, such as when the system is activated or when a device operating preparation is completed.

Referring to FIG. 11, CPU 301 acquires the image of strands 160 ejected from die 150, the image being captured by imaging device 200 as described in FIG. 5 in S100. Then, CPU 301 processes the image acquired from imaging device 200 and detects strands 160 in the image data in S110.

Next, CPU 301 calculates the strand diameter of each detected strand 160 (S120) and computes a parameter (dispersion, a standard deviation, or the like) indicating variations in the calculated strand diameters (S130).

In S140, CPU 301 determines whether the obtained standard deviation is greater than a predetermined threshold value a. In a case where the standard deviation is predetermined threshold value a or less, that is, in a case where variations in strand diameters are small (NO in S140), following steps S150 and S160 are skipped, and the processing is returned to the main routine.

On the other hand, in a case where the standard deviation is greater than predetermined threshold value a, that is, in a case where the variations in strand diameters are large (YES in S140), the processing proceeds to S150, and CPU 301 computes the driving amounts of driving units 400 corresponding to through-holes 152 with large deviations from the average value. Thereafter, CPU 301 drives the driving units by outputting a control command to target driving units 400 and adjusts the diameters of the strands ejected from these through-holes 152 to approach the average value in S160.

Specifically, in a case where the strand diameters are greater than the average value, CPU 301 drives driving units 400 such that the sectional areas of corresponding through-holes 152 in die 150 become smaller. Conversely, in a case where the strand diameters are smaller than the average value, CPU 301 drives driving units 400 such that the sectional areas of corresponding through-holes 152 become larger. In this manner, it is possible to reduce variations in strand diameters by driving driving units 400 and adjusting strokes of moving units 410 on the basis of the image data of strands 160 ejected from die 150 in the system illustrated in FIG. 9.

[Modification Examples of Adjustment Mechanisms]

In the above embodiment, the configuration example of the adjustment mechanisms that adjust the strand diameters by changing the sectional areas of the through-holes in the die has been described. The following modification examples show examples of adjustment mechanisms using methods different from the above for adjusting the strand diameters.

Modification Example 1: Temperature Control

Figure 12:
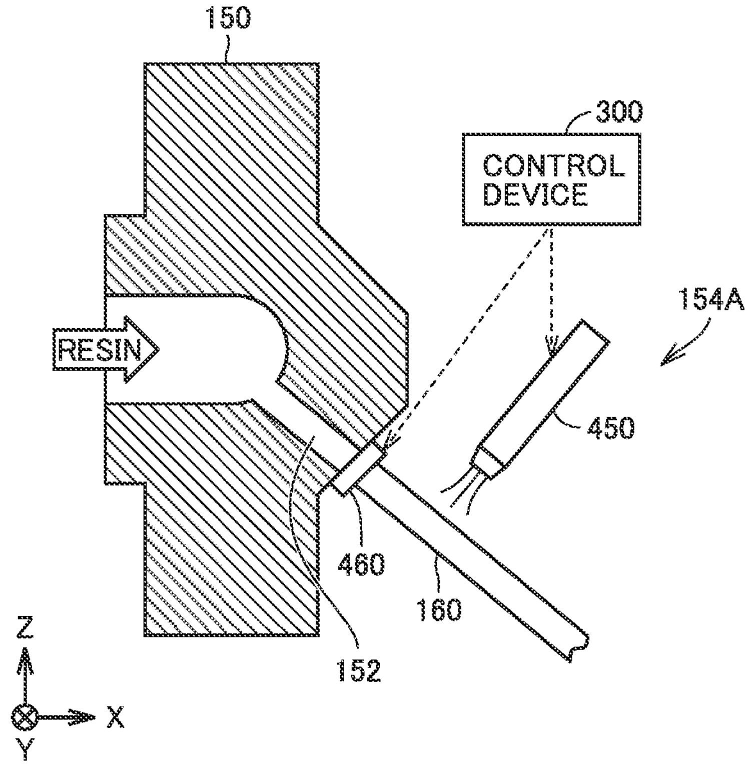
FIG. 12 is a diagram illustrating a configuration of an adjustment mechanism according to a modification example 1.

FIG. 12 is a diagram illustrating a configuration of an adjustment mechanism 154A in a modification example 1. In modification example 1, a configuration of adjusting strand diameters by adjusting the temperature of strands 160 ejected from die 150 will be described.

Referring to FIG. 12, adjustment mechanism 154A in modification example 1 includes blowers 450 and/or heaters 460. Blower 450 and heater 460 are disposed for each through-hole 152.

Blowers 450 are controlled by a control signal from control device 300 and adjust the temperatures of strands 160 by blowing hot air or cold air to ejected strands 160. Blowers 450 may be configured to switch and use hot air and cold air or may be configured to use only one of hot air or cold air.

Heaters 460 are attached to the ejection ports of through-holes 152, for example. Heaters 460 are controlled by a control signal from control device 300 and heat ejected strands 160.

Since strands 160 are softened when they are heated and their temperatures are raised, the strand diameters decrease due to a winding effect of strand cutter 30.

Conversely, since hardening of strands 160 is promoted when they are cooled, the strand diameters increase.

Note that the heating/cooling mechanism for strands 160 is not limited to the configurations disposed outside the ejection ports as illustrated in FIG. 12 and may be configured to be disposed inside die 150 to heat or cool the main body of die 150. In this case, the diameters of the strands ejected from the desired through-holes are changed by partially changing the flowing states (such as flow rates) of strands 160 inside die 150 through partial heating or cooling of die 150.

Therefore, in a case where variations in the detected strand diameters are large, it is possible to reduce the variations in strand diameters by heating/cooling the target strands by using blowers 450 and/or heaters 460 in response to a control command from control device 300.

"Blower 450" and "heater 460" in modification example 1 correspond to a "temperature adjustment unit" in the present disclosure.

Modification Example 2: Tension Control

Figure 13:
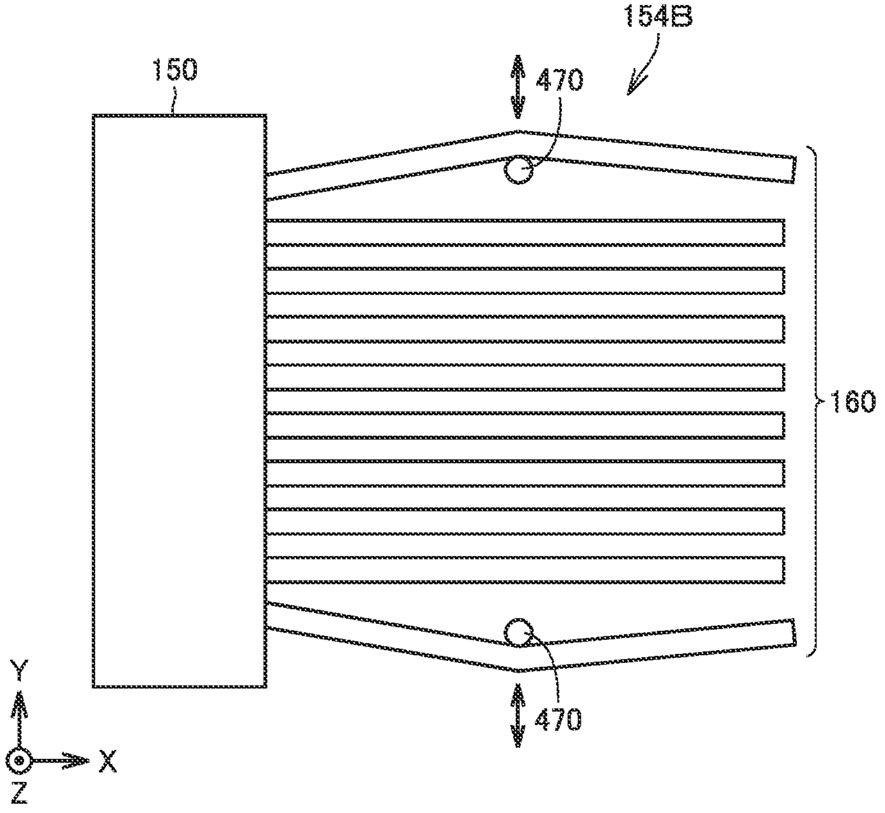
FIG. 13 is a diagram illustrating a configuration of an adjustment mechanism according to a modification example 2.

FIG. 13 is a diagram illustrating a configuration of an adjustment mechanism 154B in a modification example 2. In modification example 2, a configuration of adjusting strand diameters by adjusting tensions of strands 160 ejected from die 150 will be described.

Referring to FIG. 13, adjustment mechanism 154B in modification example 2 includes tensioners 470 for changing tensions applied to strands 160 ejected from die 150. Although the example in FIG. 13 shows a configuration in which tensioners 470 are disposed at strands 160 at both end portions of plurality of strands 160 aligned along the Y axis in the Y-axis direction, a configuration having tensioners 470 for each strand 160 may be adopted.

Tensioners 470 are formed of rod-shaped members movable in the Y-axis direction, for example, and can increase the tensions of strands 160 by tensioners 470 moving to the outside. Note that a direction in which tensioners 470 apply the tensions may not be the Y-axis direction and the tensions may be increased by causing strands 160 to move in the Z-axis direction, for example. Also, tensioners 470 may be applied to all strands 160.

When the tensions applied to strands 160 are caused to increase, the strand diameters decrease due to a change in volume. In general, the molten resin ejected from die 150 has parabolic speed distribution with the center of die 150 in the Y-axis direction included as a vertex. Therefore, it is more difficult to eject the molten resin from the through-holes located closer to the end portions of die 150 in the Y-axis direction as compared with the through-holes at the center in the Y-axis direction. In order to solve this problem, a case where a measure to promote flowing of the molten resin to the end portion side in the Y-axis direction by changing the flow path shape inside die 150 may be employed. In this case, the strand diameters at the end portions are likely to be larger as compared with those at the center in the Y axis direction, and it is thus possible to reduce variations in strand diameters by disposing tensioners 470 on the end portion side in the Y-axis direction.

On the other hand, in a case where the flow path shape inside die 150 is not changed, it is likely to increase the ejection amounts at the center and to become larger in the strand diameters as compared with the strand diameters at the end portions in the Y-axis direction as described above. Therefore, it is possible to reduce variations in strand diameters by disposing tensioners 470 at the center and increasing the tensions at the strands at the center.

"Tensioner 470" in modification example 2 corresponds to a "tension adjustment unit" in the present disclosure.

Note that the adjustment mechanisms with the configuration of changing the sectional areas of through-holes 152 in die 150 as in FIG. 2 or FIG. 5 and the adjustment mechanisms with the configuration of changing the temperature as in modification example 1 may also be configured such that the adjustment mechanisms are disposed only at some of through-holes 152 rather than for all the strands.

As described above, it is possible to adjust the strand diameters even during an operation of the extrusion device by providing the adjustment mechanisms capable of individually adjusting the strand diameters of the strands ejected from the die in the extrusion device. It is thus possible to uniformize the strand diameters. Also, it is possible to detect the strand diameters in real time during an operation of the extrusion device by providing the imaging device or the monitoring device using a displacement sensor. It is thus possible to quickly perform adjustment even in a case where the strand diameters change during an operation. Furthermore, it is possible to omit user's time and effort for adjustment and to further reduce variations in strand diameters by employing the configuration in which the adjustment mechanisms are automatically controlled by using data regarding the strand diameters detected by the monitoring device.

The embodiment disclosed herein should be considered as illustrative examples and not limitations in any sense.

REFERENCE SIGNS LIST

10 Pellet manufacturing apparatus
20 Cooling tank
21 Coolant
30 Strand cutter
50 Pellet
60, 60A Monitoring device
100 Extrusion device
110, 400 Driving unit
120 Cylinder
121 Inlet port
122, 460 Heater
130 Screw
140 Feeder
150 Die
152 Through-hole
153 Recessed portion
154, 154A, 154B Adjustment mechanism
155 Die holder
156 Flow-in portion
157 Flow path portion
158 Flow-out portion
160 Strand
200 Imaging device
250 Mobile terminal
251 Display
252, 306, 307 Region
300 Control device
301 CPU
302 Memory
303 Bus
305 Display device
310 Image acquisition unit
320 Image processing unit
330 Strand diameter computing unit
340 Variation determination unit
350 Driving control unit
410 Moving unit
450 Blower
470 Tensioner

The invention claimed is:

1. An extrusion device comprising:

a cylinder;

a raw material feed port configured to supply raw materials including resin into the cylinder;

a screw that is incorporated in the cylinder and kneads the raw materials, allowing the raw materials to be molten;

a die that is disposed at one end of the cylinder and includes a plurality of through-holes to eject strands made of molten resin supplied from the cylinder; and an adjustor that adjusts individually an ejection amount of the strand ejected from each of the plurality of through-holes, wherein the adjustor includes, for each through-hole, a corresponding temperature adjustment unit to individually adjust a temperature of the strand ejected from a corresponding through-hole.

2. The extrusion device according to claim 1, wherein the adjustor includes a moving unit that is provided for each of the plurality of through-holes and is allowed to project into the corresponding through-hole, and the ejection amount of the strand ejected from the through-hole per unit time is adjusted by changing an amount of projection of the moving unit into the corresponding through-hole and thereby adjusting a sectional area of the through-hole.

3. The extrusion device according to claim 2, wherein the moving unit includes a screw mechanism that changes the amount of projection into the corresponding through-hole by the moving units rotating.

4. The extrusion device according to claim 2, wherein the adjustor further includes a driving unit to drive the moving unit.

5. The extrusion device according to claim 4, wherein the driving unit is any of a pneumatic type, a hydraulic type, or an electric type.

6. The extrusion device according to claim 1, wherein the adjustor includes a tension adjustment unit to adjust tension acting on the strand ejected from the through-hole.

7. The extrusion device according to claim 1, further comprising:

a monitor that detects strand diameter of the strand ejected from the die.

8. The extrusion device according to claim 7, further comprising:

a control device that controls the adjustor on a basis of the strand diameter detected by the monitor.

9. The extrusion device according to claim 8, wherein the control device controls the adjustor to reduce variations in detected strand diameter.

10. The extrusion device according to claim 9, wherein the control device calculates an average value of the detected strand diameters, and controls the adjustor such that a difference between each strand diameter and an average value falls within a predetermined range.

11. An extrusion molding die comprising:

a main body portion in which a flow-in port, a plurality of through-holes and a flow path portion are formed, kneaded molten resin being supplied to the flow-in port, strands of the supplied molten resin being ejected from the plurality of through-holes, the flow path portion extending in a flow path direction from the flow-in port to the plurality of through-holes; and an adjustor that is able to adjust individually an ejection amount of the strand ejected from each of the plurality of through-holes, wherein the adjustor includes, for each through-hole, a corresponding temperature adjustment unit to individually adjust a temperature of the strand ejected from a corresponding through-hole.

12. An extrusion device comprising:

a cylinder;

a raw material feed port configured to supply raw materials including resin into the cylinder;

a screw that is incorporated in the cylinder and kneads the raw materials, allowing the raw materials to be molten;

a die that is disposed at one end of the cylinder and includes a plurality of through-holes to eject strands made of molten resin supplied from the cylinder; and an adjustor that adjusts individually an ejection amount of the strand ejected from each of the plurality of through-holes, wherein the adjustor includes, for each through-hole, a corresponding temperature adjustment unit to individually adjust a temperature of the strand ejected from a corresponding through-hole, and wherein the adjustor includes a tension adjustment unit to adjust tension acting on the strands ejected from the through-holes.

13. An extrusion molding die comprising:

a main body portion in which a flow-in port, a plurality of through-holes and a flow path portion are formed, kneaded molten resin being supplied to the flow-in port, strands of the supplied molten resin being ejected from the plurality of through-holes, the flow path portion extending in a flow path direction from the flow-in port to the plurality of through-holes; and an adjustor that is able to adjust individually an ejection amount of the strand ejected from each of the plurality of through-holes, wherein the adjustor includes, for each through-hole, a corresponding temperature adjustment unit to individually adjust a temperature of the strand ejected from a corresponding through-hole, and wherein the adjustor includes a tension adjustment unit to adjust tension acting on the strands ejected from the through-holes.

* * * * *